US011989581B2

(12) United States Patent
Shah et al.

(10) Patent No.: US 11,989,581 B2
(45) Date of Patent: May 21, 2024

(54) SOFTWARE MANAGED MEMORY HIERARCHY

(71) Applicant: SiMa Technologies, Inc., San Jose, CA (US)

(72) Inventors: Nishit Shah, Sunnyvale, CA (US); Reed Kotler, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 250 days.

(21) Appl. No.: 16/852,326

(22) Filed: Apr. 17, 2020

(65) Prior Publication Data

US 2021/0326173 A1    Oct. 21, 2021

(51) Int. Cl.
| | |
|---|---|
| *G06F 12/00* | (2006.01) |
| *G06F 9/38* | (2018.01) |
| *G06F 9/48* | (2006.01) |
| *G06F 9/50* | (2006.01) |
| *G06F 12/02* | (2006.01) |
| *G06N 3/063* | (2023.01) |

(52) U.S. Cl.
CPC .......... *G06F 9/4881* (2013.01); *G06F 9/3836* (2013.01); *G06F 9/5027* (2013.01); *G06F 12/02* (2013.01); *G06N 3/063* (2013.01)

(58) Field of Classification Search
CPC ...... G06F 12/00; G06F 9/4881; G06F 9/3836; G06F 9/5027; G06F 12/02; G06N 3/063
USPC ........................................................ 711/122
See application file for complete search history.

(56) References Cited

U.S. PATENT DOCUMENTS

| | | | | |
|---|---|---|---|---|
| 7,774,531 | B1 * | 8/2010 | Karlsson ............... | G06F 9/3863 710/36 |
| 7,774,552 | B1 * | 8/2010 | Cypher ............... | G06F 9/30043 711/144 |
| 9,928,460 | B1 | 3/2018 | Nowatzyk et al. | |
| 10,810,784 | B1 * | 10/2020 | Rai ....................... | G06F 9/3851 |

(Continued)

OTHER PUBLICATIONS

Andri et al., "YodaNN: An Architecture for Ultralow Power Binary-Weight CNN Acceleration", IEEE Transactions on Computer-Aided Design of Integrated Circuits and Systems, vol. 37, No. 1, Jan. 2018, pp. 48-60.
Ankit et al., "PUMA: A Programmable Ultra-efficient Memristor-based Accelerator for Machine Learning Inference", ASPLOS'19, Apr. 13-17, 2019, Providence, RI, USA, pp. 715-731.

(Continued)

*Primary Examiner* — Gautam Sain
(74) *Attorney, Agent, or Firm* — Fenwick & West LLP

(57) ABSTRACT

A method, system, and apparatus are disclosed herein for bridging a deterministic phase of instructions with a non-deterministic phase of instructions when those instructions are executed by a machine learning accelerator while executing a machine learning network. Specifically, data is transferred from off-chip memory to on-chip memory (non-deterministic phase of instructions). The data transfer involves determining whether certain on-chip memory is already storing data that has not been consumed yet (e.g., certain memory locations on-chip may be storing data for future consumption and should not be overwritten). Based on determining that the certain on-chip memory is not storing data that has not been consumed yet, the data may be transferred from the off-chip memory to the on-chip memory and the target memory locations may be marked as storing data that has not been consumed yet. The deterministic phase of instructions may be started subsequently.

20 Claims, 6 Drawing Sheets

(56) References Cited

U.S. PATENT DOCUMENTS

| | | | |
|---|---|---|---|
| 2003/0141434 | A1 | 7/2003 | Ishikawa et al. |
| 2004/0088488 | A1* | 5/2004 | Ober .................... G06F 9/3851 |
| | | | 712/E9.055 |
| 2004/0103251 | A1* | 5/2004 | Alsup ................ G06F 12/0897 |
| | | | 711/E12.043 |
| 2005/0086451 | A1 | 4/2005 | Yates, Jr. et al. |
| 2011/0199391 | A1* | 8/2011 | Olsson ...................... G06T 1/60 |
| | | | 345/531 |
| 2012/0084238 | A1 | 4/2012 | Kristal et al. |
| 2014/0164748 | A1* | 6/2014 | Dundas ............... G06F 12/0862 |
| | | | 712/237 |
| 2014/0173216 | A1* | 6/2014 | Jayasena ............. G06F 12/0891 |
| | | | 711/135 |
| 2019/0004878 | A1 | 1/2019 | Adler et al. |
| 2019/0018815 | A1 | 1/2019 | Fleming et al. |
| 2019/0042920 | A1* | 2/2019 | Akin ................... G06N 3/0481 |
| 2019/0076031 | A1 | 3/2019 | Valys et al. |
| 2019/0155768 | A1 | 5/2019 | Wilkinson et al. |
| 2019/0273662 | A1 | 9/2019 | Mwanje et al. |
| 2019/0286973 | A1 | 9/2019 | Kovvuri et al. |
| 2019/0303346 | A1 | 10/2019 | Brewer |
| 2019/0325303 | A1 | 10/2019 | Daga et al. |
| 2019/0391796 | A1 | 12/2019 | Brady et al. |
| 2020/0007342 | A1 | 1/2020 | Liem et al. |
| 2020/0012536 | A1 | 1/2020 | Lacey et al. |
| 2020/0012537 | A1 | 1/2020 | Lacey et al. |
| 2020/0073830 | A1 | 3/2020 | Verrilli et al. |
| 2020/0090383 | A1 | 3/2020 | Dwivedi |
| 2020/0133914 | A1 | 4/2020 | Wilkinson et al. |
| 2020/0150713 | A1 | 5/2020 | Knowles et al. |
| 2021/0124626 | A1* | 4/2021 | Manula .................... G06F 9/522 |
| 2021/0201526 | A1 | 7/2021 | Moloney et al. |
| 2021/0216464 | A1* | 7/2021 | Uhrenholt ........... G06F 12/0891 |

OTHER PUBLICATIONS

Chen et al. "DianNao: A Small-Footprint High-Throughput Accelerator for Ubiquitous Machine-Learning;" ACM SIGARCH Computer Architecture News, vol. 42, Issue 1, pp. 269-284, Mar. 5, 2014 (Mar. 5, 2014) Retrieved on Jul. 25, 2021 (Jul. 25, 2021) from <https://dl.acm.org/doi/abs/10.1145/2654822.2541967>.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

International Search Report and Written Opinion, Patent Cooperation Treaty Application No. PCT/US2021/025001, Jun. 10, 2021, 14 pages.

International Search Report and Written Opinion, Patent Cooperation Treaty Application No. PCT/US2021/027787, Aug. 25, 2021, 18 pages.

Jiao et al., "A 12nm Programmable Convolution-Efficient Neural-Processing-Unit Chip Achieving 825TOPS", ISSCC 2020, Session 7, Feb. 18, 2020, 5 pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification: A Review", IEEE Access, vol. 7, 2019, pp. 7823-7858.

\* cited by examiner

300:

400:

SOFTWARE MANAGED MEMORY HIERARCHY

BACKGROUND

Technical Field

This disclosure relates generally to the implementation of machine learning networks on hardware, and more particularly to memory management.

Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input into the machine learning network, which then outputs whether (or to what confidence level) objects are present within the images.

Machine learning networks typically require the handling of a large volume of data and the execution of a large number of computations. As a result, they are commonly implemented in compute facilities with access to significant resources, such as in the cloud or on server clusters. However, the sources of input to machine learning networks may be located remotely from these compute facilities. For example, cameras and other types of sensors may be located on the edge of the network. Thus, one common paradigm is for the input sources to be web-based so that they can continuously send their captured data to the cloud-based compute facility, which then executes the machine learning network and returns the result.

However, there can be many advantages if the machine learning network was instead embedded on edge devices, such as combined with the camera system. Many types of edge devices (e.g., cameras) are built with limited resources (e.g., limited memory, processing power, etc.). This may be due to power consumption, build complexity, size, and other considerations. Thus, when machine learning networks are placed on edge devices, those edge devices may be adapted to deal with limited resources. In particular, limited memory may be an issue because memory banks add to the size, complexity, and power consumption of those devices. This holds true especially for memory that resides on the same die as the processor itself (e.g., static random-access memory (SRAM)). Therefore, memory optimization both in hardware and software may be advantageous to execute machine learning networks on edge devices.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1:
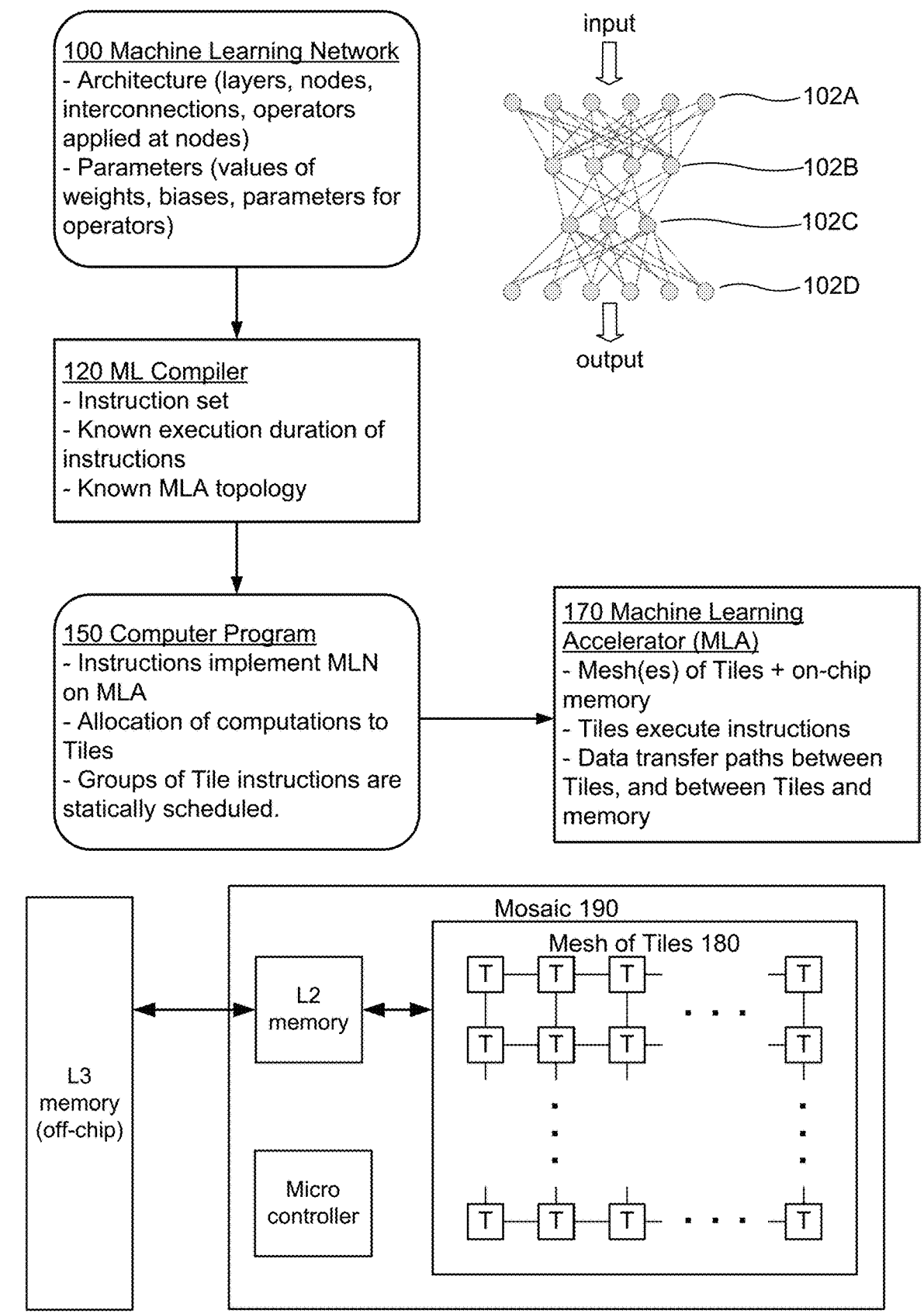
FIG. 1 is a block diagram of a system with a machine learning accelerator (MLA) and corresponding compiler, in accordance with some embodiments of this disclosure.

The figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

As will be described in more detail below, one method of optimizing execution of a machine learning network is to use a compiler that can, prior to run-time, statically schedule instructions for executing a machine learning network. For example, the compiler can statically schedule instructions including read and write memory instructions enabling execution with no conditions, branching or dependencies, which may result in lower power consumption, resource usage, and lower cost. However, because on-chip memory is limited, at least some data may be stored in off-chip memory before it is transferred to the on-chip memory for processing. Because off-chip memory has variable access time, the compiler, prior to run-time, may not be able to predict when data retrieved from the off-chip memory is ready to be processed. Thus, some instructions (or sets of instructions) may not be statically scheduled.

To address this issue, data transfer instructions or groups of instructions (e.g., instructions for read and write operations) may be split into non-deterministic phases (e.g., off-chip memory access) and deterministic phases (e.g., on-chip memory access). To transfer the data from the off-chip memory to the on-chip memory (during a non-deterministic phase of instructions), for example, a microcontroller (sometimes referred to as a controller) may determine whether certain on-chip memory is already storing data that has not been consumed yet (e.g., certain memory locations on-chip may be storing data for future consumption and should not be overwritten). Based on determining that the certain on-chip memory is not storing data that has not been consumed yet, the microcontroller may transfer the data from the off-chip memory to those locations in the on-chip memory. When the data is transferred to the on-chip memory, the target memory locations may be marked as storing data that has not been consumed yet (live data). Subsequently, the deterministic phase of instructions (e.g., transfer between memory locations on chip and data processing) may be started.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

FIG. 1 is a block diagram of one example of a system with a machine learning accelerator (MLA) 170 and corresponding compiler 120, according to the invention. The compiler 120 receives a description of a machine learning network 100 and generates a computer program 150 that implements the machine learning network using MLA 170. The computer program 150 includes instructions that are executed by processing elements (Tiles) in the MLA according to a schedule determined by the compiler. The instructions executed by the Tiles (Tile instructions) are statically scheduled because the compiler can determine which instructions are executed by which Tiles at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption, and higher performance, all of which are desirable for implementation in edge devices.

In more detail, the MLN 100 may be described by an architecture and parameters. A depiction of an MLN is shown to the right of box 100 in FIG. 1. Most MLNs include multiple layers 102, each with one or more nodes which are represented by circles in FIG. 1. The lines between nodes in FIG. 1 represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tan h function), softmax operator, etc. A typical node may compute an output:

$$y=F(\Sigma w_i x_i + b) \quad (1)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 170 includes a plurality of Tiles 180 and an on-chip memory system implemented on a semiconductor die. The Tiles are organized into one or more meshes of interconnected Tiles. A depiction of a Tile mesh is shown below box 170 in FIG. 1. In each mesh, the Tiles 180 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 1, the computations performed by layers 102A-D are allocated to groups of Tiles. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 120 receives a description of the MLN 100 and generates a computer program 150 that implements the MLN using the MLA 170. The computer program 150 receives an input sample for the MLN and executes the operations of the MLN to produce the output for the MLN. The computer program 150 includes instructions to be executed by the Tiles for implementing computations in the MLN and may also include instructions to be executed by other elements, such as a controller outside the Tiles.

The MLA includes, on a single die, as part of a single chip one or more Mosaics 190, each Mosaic 190 including on-chip memory. The on chip-memory may be a multi-level memory system, which includes a level 1 (L1) memory distributed among the Tiles (e.g., as shown in FIG. 6) and a level 2 (L2) memory (e.g., as will be discussed in relation to FIG. 5) that is shared by the Tiles. If there are multiple mosaics, the MLA may include a dedicated interconnect for connecting the different mosaics. The MLA is also connected to an off-chip memory (sometimes referred to as level 3 (L3) memory) which is located on a different die. The MLA also includes a microcontroller that performs a number of functions, one of them being a transfer of data from off-chip memory to the on-chip memory. For additional examples and details, see U.S. application Ser. No. 16/840, 216, "Machine Learning Network Implemented by Statically Scheduled Instructions, with Compiler," which is incorporated by reference herein in its entirety. The Tiles execute instructions for data transfers within the on-chip memory (e.g., between L1 memories, and between L1 and L2 memories), but do not execute instructions for data transfers to and from the off-chip memory system (e.g., L3 memory), which may be handled by a microcontroller or another suitable component. Instructions for transfers between on-chip memories are generated and are statically scheduled by the compiler, while instructions for transfers to and from the off-chip memory are not statically scheduled.

Figure 2:
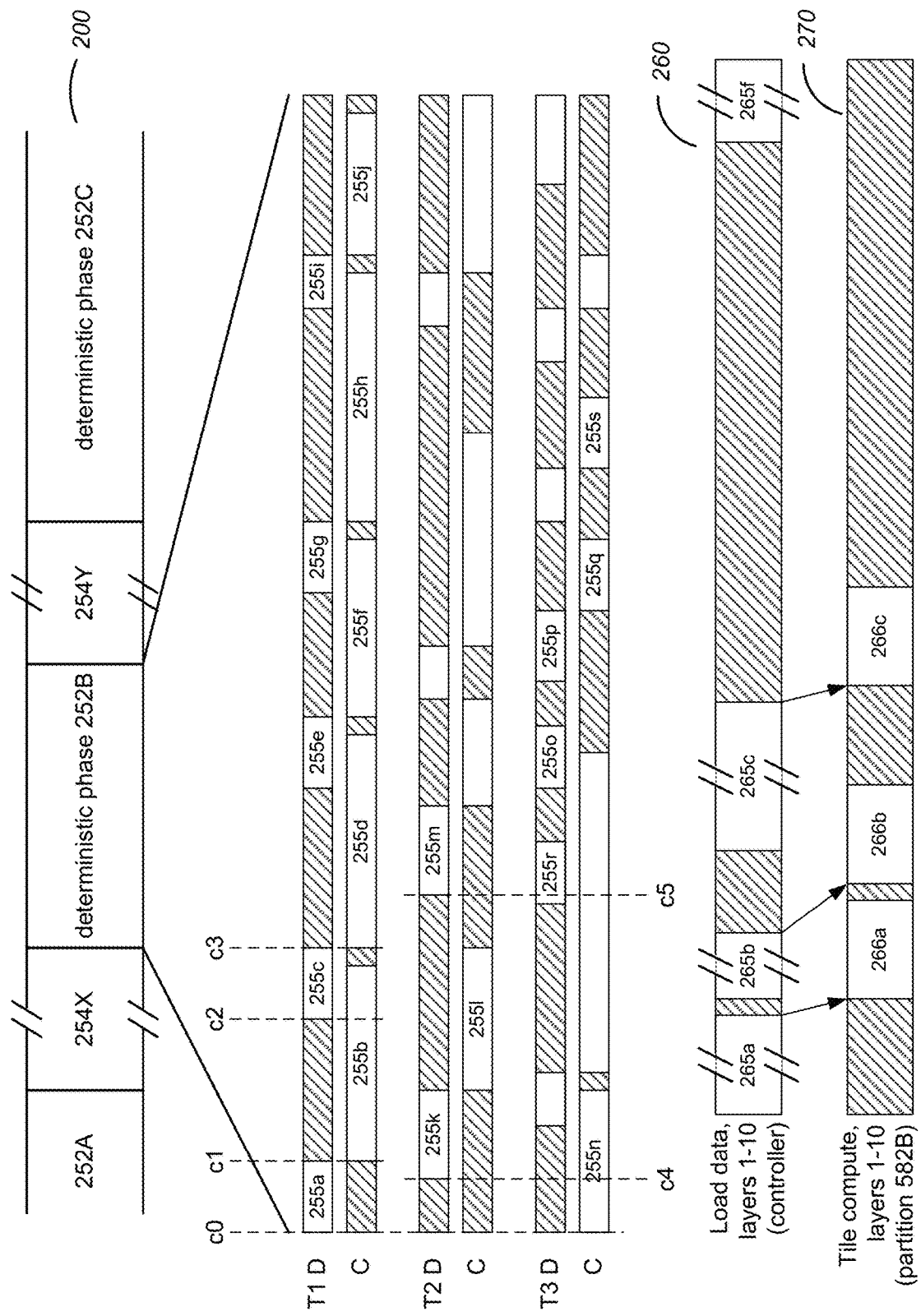
FIG. 2 illustrates partitioning a computer program into deterministic and non-deterministic phases, in accordance with some embodiments of this disclosure.

As discussed above, the MLA uses Tiles to execute machine learning instructions. However, sometimes the data or instructions that a Tile uses may reside originally in the off-chip memory (L3 memory). The data is brought from the off-chip memory to the on-chip memory before a Tile can use the data. Off-chip memory may be memory with variable access times (e.g., Dynamic Random-Access Memory (DRAM)). Thus, when data is transferred from the off-chip memory, the amount of time (e.g., the number of cycles) that the transfer takes may not be determined prior to execution. Thus, operations that include data transfer with data transfer times that are unknown prior to execution may be implemented as part of a "non-deterministic" phase of execution. The non-deterministic phase instructions may be executed by a microcontroller (as shown in FIGS. 1 and 2).

An exemplary microcontroller may be an ARM M4 processor that orchestrates the off-chip memory accesses. This microcontroller may have an MLC (ML Compiler) thread running on it and the compiled code is responsible for initiating the data transfer from off-chip (e.g., DRAM) memory and subsequent notification to the respective Tiles. The compiled MLC thread is responsible for retrieving and posting data to external memory as well as any interactions with external interfaces.

In some implementations, access to off-chip memory is performed by a Direct Memory Access (DMA) controller that is managed by the microcontroller. The microcontroller communicates with the rest of MLA using one or more interfaces. The microcontroller is also responsible for generating the first 'kickstart' instruction (a 'Fetch Instructions' instruction) to each of the Tiles that consumes the data that has been received and written into the L2 memory. In addition, the microcontroller may include a core for executing instructions. The core may include a floating-point unit.

When a Tile executes an instruction, the Tile accesses the data for the instruction from the on-chip memory dedicated to the Tile (L1 memory). However, it is possible for the Tile to access the data directly from L2 memory. Because the L1 and L2 memories are implemented as SRAM, the length of time (e.g., number of clock cycles) used to transfer data between L1 memories or between L1 and L2 memories are known, so data transfer instructions for these transfers can be statically scheduled. As a result, these instructions may be included in a "deterministic phase" of instructions.

When Tiles execute an MLN, a deterministic phase of instructions may follow a non-deterministic phase of instructions and vice versa. One mechanism for bridging the non-deterministic phase of instructions and the deterministic phase of instructions includes marking addresses in on-chip memory as occupied (e.g., setting a flag) when live data has been transferred into the memory corresponding to those addresses. When a microcontroller executes an instruction to transfer data from the off-chip memory to the on-chip memory, the microcontroller may determine whether potential target addresses in the on-chip memory are storing live data (i.e., whether those addresses are occupied). The microcontroller may make this determination by checking a flag associated with each potential target address. If the flag indicates that live data is not being stored in memory corresponding to the target address (i.e., the corresponding memory is free), the microcontroller may write new data into that memory. If the flag indicates that live data is being stored in the memory corresponding to the target address (i.e., memory is occupied), the microcontroller may not write new data into that memory. When the microcontroller writes the data into memory that corresponds to the target addresses that have been marked as not storing live data (i.e., free), the microcontroller marks the target addresses as storing live data (i.e., occupied).

When the live data has been written into the on-chip memory, the live data is now ready to be consumed by the Tiles. As referred to herein, the term live data refers to data that a Tile has not yet consumed for execution (e.g., data that the Tile has not yet transferred from L2 memory into L1 memory). Thus, marking target addresses after live data is transferred from the off-chip memory to the on-chip memory is one component of bridging a non-deterministic phase and a deterministic phase. Another component of bridging a non-deterministic phase and a deterministic phase involves synchronizing execution of instructions for a particular deterministic phase.

A deterministic phase of instructions where instructions are statically scheduled may follow the non-deterministic phase. The deterministic phase of statically scheduled instructions is executed by the Tiles. The deterministic phase can include instructions for accessing the data stored in the on-chip memory, transferring the data between on-chip memories (e.g., between L1 and L2 memory), performing computations from the MLN, and other suitable instructions. Thus, each Tile that is participating in a given deterministic phase may access (e.g., consume) the live data and perform operations using the live data.

When a Tile has finished consuming the live data stored in the on-chip memory (e.g., L2 memory), the Tile may mark the addresses where the consumed data was stored as no longer storing live data (i.e., free). For example, a Tile may transfer the data from L2 memory into L1 memory for a matrix multiplication operation. When the data is transferred, the Tile may mark the addresses associated with the memory from where the data was transferred as no longer storing live data (i.e., that the data can be overwritten).

Various types of Tile instructions may be used for marking addresses in memory as no longer storing live data. In some implementations, the statically scheduled Tile instructions that access the live data stored in the on-chip memory also mark the addresses as not storing live data. For example, an instruction may be used to transfer the data from L2 memory to L1 memory (e.g., a read/write instruction). The instruction may also mark the addresses where the transferred data was stored as not storing live data. Thus, the instruction to transfer data from L2 memory to L1 memory may be different from, for example, an instruction to transfer data between different L1 memories because the transfer instruction from L2 to L1 memory performs the marking.

In some implementations, multiple statically scheduled Tile instructions access the same live data stored in the on-chip memory, and the addresses are marked as not storing live data only after the last access by said multiple Tile instructions. For example, the compiler discussed above, may determine that multiple Tiles need the data transferred into certain addresses in L2 memory. The compiler may generate a first Tile instruction for the first Tile to transfer the data into L1 memory associated with the Tile. That first instruction may not mark the associated addresses in the L2 memory as not storing live data. In other words, when the data is consumed by the first Tile the addresses in L2 memory are not marked as free because a second Tile needs that data to perform MLN operations. The compiler may generate a second Tile instruction for a second Tile to transfer the data into L1 memory associated with the second Tile. The second Tile instruction may mark the associated addresses as not storing live data. In other words, the second Tile instruction marks the memory as free because the live data has now been consumed by both Tiles. Thus, the compiler may schedule different instructions for transferring data from L2 to L1 memory depending on whether the associated addresses in L2 memory are to be marked as no longer storing live data (i.e., free).

In some implementations, the addresses are marked as not storing live data by Tile instructions that are separate from the Tile instructions that access the live data stored in the on-chip memory. For example, the compiler may determine that a data transfer instruction is needed to transfer some live data from L2 memory to L1 memory. Based on that determination, the compiler may add a new instruction after the transfer instruction to mark the associated addresses as no longer storing any live data.

When Tile instructions mark certain addresses in the on-chip memory (e.g., L2 memory) as not storing any live data, those addresses may be used by the microcontroller to transfer more data from the off-chip memory (e.g., L3 memory). Thus, when the compiler schedules these instructions the compiler partitions the instructions into deterministic and non-deterministic phases of instructions. For example, the execution pipeline 200 of FIG. 2 shows that the compiler partitions the Tile instructions into one or more deterministic phases 252A, B, C which typically utilize multiple Tiles. The instructions in a deterministic phase 252 may be statically scheduled by the compiler. For example, a deterministic phase 252 may include a series of computations required to implement a portion of the MLN, where the time required for each computation and associated data transfers is known. As a result, the compiler may statically schedule the Tile instructions within that deterministic phase relative to the other Tile instructions in the phase. The resulting computer program produced by the compiler then implements an allocation of instructions to Tiles and a schedule for executing the instructions as determined by the compiler, although these may not be expressly contained within the computer program. In the example of FIG. 1, the computations performed by layers 102A-D are allocated to groups of Tiles. In addition, all of the Tile instructions (including both for computation and for data transfer) are executed in a single deterministic phase.

The computer program may also include non-deterministic phases 254X and 254Y. For example, the non-deterministic phases 254 may include data fetch or instruction fetch from off-chip memory where the time required to execute the operation varies too much to allow reliable synchronization with other operations. Other examples include computations that occur off-chip, and conditions, branching and other programmatic constructs that depend on values not known until run-time. The breaks in the rectangles for the non-deterministic phases 254 indicate that the timing is not deterministic, whereas the deterministic phases 252 are represented by rectangles without breaks. In FIG. 2, the deterministic and non-deterministic phases are shown as alternating. This is not required. For example, deterministic and non-deterministic phases may execute concurrently.

FIG. 2 also shows more detail of deterministic phase 252B, which shows the static schedule computed by the compiler for executing Tile instructions in this phase. The phase 252B begins at some time with when all of the Tiles are synchronized, which for convenience is marked as cycle c0 in FIG. 2. The Tiles may have circuitry that synchronizes the Tiles. For example, each Tile may monitor when it is ready to begin execution of a deterministic phase 252B and then actual execution begins when all Tiles signal that they are ready. Alternatively, an external controller may synchronize the Tiles and start the deterministic phase 252B when all tiles are ready.

In this example, the instructions are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 255a transfers data into Tile 1 and instruction 255b then performs a computation that consumes that data. Instruction 255b is dependent on instruction 255a. Here, the T1 C pipeline is not required to continuously poll the T1 D pipeline at run-time for when the data is available, and there is no run-time message passing between the pipelines is not required to indicate that the data is available. Rather, because the duration (i.e., time required to execute) of instruction 255a is known, the compiler knows when the data will be available (for convenience, marked as cycle c1 in FIG. 2) and can construct a static schedule in which instruction 255b starts execution then. The duration of instruction 255b is also known, so the compiler knows that compute instruction 255d may start after instruction 255b. In this case, the compiler determines a static schedule for which instruction 255d starts at cycle c3. Compute instruction 255d depends on data brought into the Tile by instruction 255c. The duration of instruction 255c is known, so the compiler knows that in the static schedule, instruction 255c must start at cycle c2 or earlier. This pattern is repeated for pairs of data transfer instructions and compute instructions 255e-f, 255g-h, 255i-j.

For Tile 2, compute instruction 255l depends on data from data transfer instruction 255k. However, instruction 255k does not start immediately at cycle 0. Rather, it has a delayed start at cycle 3. This may be because the data transfer path required by instruction 255k is occupied by some other data transfer instruction and is not available until cycle 3. The start time of instruction 255k in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 255k does not start until cycle c4 when the compiler knows the data transfer path will be available. Similarly, data transfer instruction 255m has a delayed start time. Perhaps the T2 D pipeline is being used to transfer out the results of computation 255l and does not become available until cycle c5.

For Tile 3, computation 255n starts immediately at cycle 0. Perhaps the required data was loaded into Tile 3 during some prior phase. Data transfer instructions 255o and 255p load data for compute instruction 255q. They are separated in time, perhaps because different pieces of data were not available, or the data transfer paths were not available until those times. As a final example, data transfer instruction 255r loads data for compute instruction 255s. In the static schedule, the compiler places instruction 255r well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 1B, the computer program may specify that instruction 155a executes at cycle c0, instruction 155b at cycle c1, instruction 155c at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 155a will end at cycle c1 and instruction 155b is supposed to begin at cycle c1. It may fill the space between cycles c0 and c1 with NO-OPs for the T1 C pipeline. The T1 C pipeline then just continuously executes instructions from its queue, and the NO-OPs ensure that instruction 155b is executed according to the compiler's static schedule. In yet another approach, the static schedule may be implemented by hardware. The T1 C pipeline may just stall on the execution of instruction 155b until the data from instruction 155a is ready. The compiler knows that data will be ready at cycle c1 and, therefore, instruction 155b will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

In order to statically schedule the instructions in a deterministic phase, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or check for or resolve contentions and collisions on shared data transfer paths at run-time may be avoided. The need for routing tables and other circuitry to determine routing at run-time may also be avoided. Other aspects include components, devices, systems, improvements, methods, processes, applications, computer readable mediums, and other technologies related to any of the above.

As discussed above, the compiler may not be able to statically schedule all instructions because some data may be stored in off-chip memory where access times may not be known prior to run time. Thus, a deterministic phase of statically scheduled instructions may be followed by a non-deterministic state of instructions. FIG. 2 also shows rows 260 and 270 that illustrate deterministic and non-deterministic phases. Row 260 represents a non-deterministic phase while row 270 represents a deterministic phase. The white regions of each row denote the execution of instructions and the hashed regions indicate idling. Non-deterministic instructions are indicated by breaks in the rectangles. Pipeline 260 includes instructions to load data for the computations of layers 1-10 from off-chip memory (e.g., DRAM) into the MLA. This data will be consumed by a Tile partition 282B. Referring to FIG. 1, this is performed by the microcontroller. Phase 265 is non-deterministic because it includes loads from off-chip memory (e.g., DRAM). Row 270 includes deterministic phase 266 of statically scheduled Tile instructions that implement the computations for layers 1-10.

The suffixes indicate different inputs samples. The phases that end in -a apply the MLN to one input sample, the phases that end in -b apply the MLN to the next input sample, etc. The arrows indicate dependencies. Consider first input sample a. A microcontroller loads 265a the relevant data (input values, weights, biases, operator parameters) from off-chip memory (e.g., DRAM) into the MLA memory (e.g., L2 memory). After this is completed, the Tiles may perform their computations 266a using this data.

The processing of input samples b and c have the same dependencies and general flow. For input sample b, the data load 265b completes early but the data must wait until partition 282B is available for computation. Once begun, the Tile computation 282B has a known duration. For input sample c, the data load 265c takes a long time. As a result, all the downstream operations are delayed.

Figure 3:
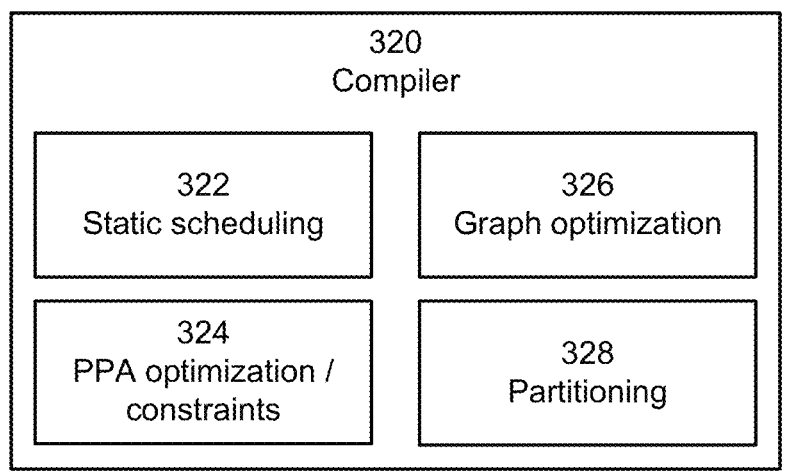
FIG. 3 is a block diagram of exemplary components of a machine learning (ML) compiler, in accordance with some embodiments of this disclosure.

FIG. 3 is a block diagram of exemplary components of an ML compiler 320. The compiler 320 may perform operations including static scheduling 322, PPA (power performance area) optimizations 324, graph optimizations 326 and/or partitioning 328. Static scheduling 322 involves the compiler converting the machine learning network to a computer program of Tile instructions, including statically scheduling an order of execution of multiple Tile instructions. The scheduling also includes scheduling the Tile instructions that access the live data and the Tile instructions that mark the addresses as not storing live data. Thus, the compiler converts the machine learning network to a computer program of instructions, including the non-deterministic phase of instructions and the deterministic phase of statically scheduled Tile instructions.

PPA optimization 324 includes different optimizations of the computer program. For example, the allocation of MLN computations to Tiles may be optimized to reduce power consumption, to increase performance (such as reducing latency or increasing throughput) and/or to reduce area (e.g., number of Tiles used).

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 320 may also optimize a computer program generated by the compiler, subject to constraints on power, performance, area and/or any of the quantities described above. Graph optimization 326 includes analysis of the graph representing the MLN to prune, merge or quantize links, parameters, values, and layers to achieve better performance. Partitioning 328 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

Figure 4:
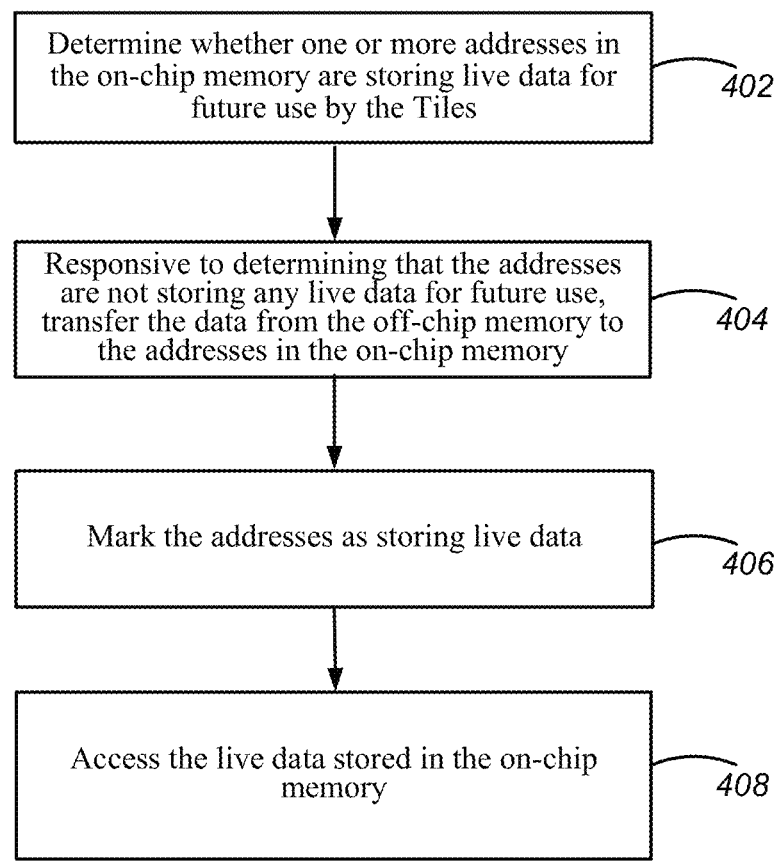
FIG. 4 illustrates an exemplary process for bridging a non-deterministic phase and a deterministic phase, in accordance with some embodiments of this disclosure.

FIG. 4 illustrates an exemplary process for bridging a non-deterministic phase of instructions and a deterministic phase of instructions. At 402, a microcontroller determines whether one or more addresses in the on-chip memory are storing live data for future use by the Tiles. The microcontroller may determine whether each address is storing live data using various methods.

Figure 5:
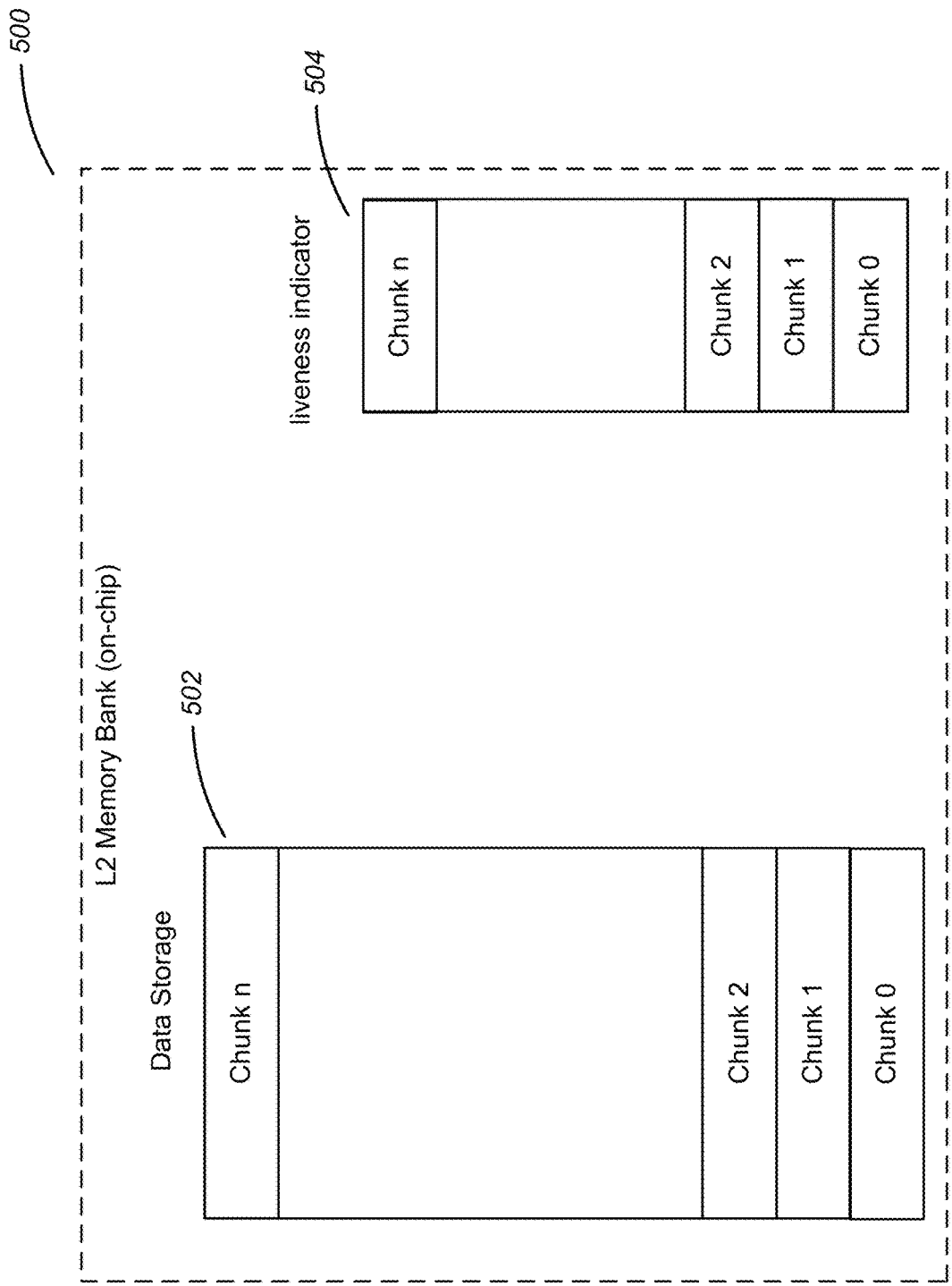
FIG. 5 illustrates an exemplary architecture for determining whether a memory location is storing live data and marking a memory location for storing live data or not storing live data, in accordance with some embodiments of this disclosure.
Figure 6:
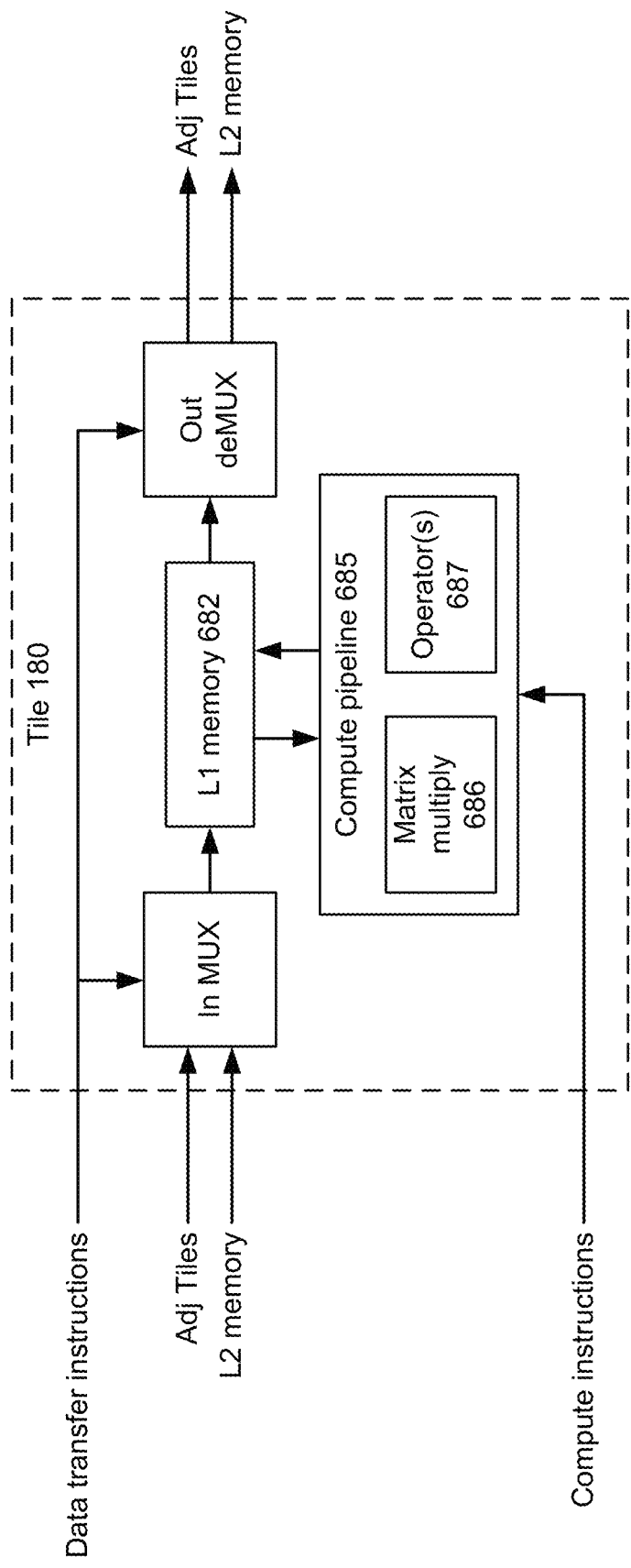
FIG. 6 illustrates a Tile within the MLA that executes computations using the live data.

FIG. 5 illustrates an exemplary memory bank architecture used in determining whether a memory location is storing live data and marking a memory location for storing live data or not storing live data (action 402). Memory bank 500 is an exemplary memory bank for L2 memory that includes storage 502 for storing data. Storage 502 is split into a multitude of chunks (e.g., storing 256 kilobytes of data). Each chunk can store data and can be addressed for reading and writing data. In addition, memory bank 500 includes a storage area 504 for storing liveness indicators. Each chunk of memory in storage 502 has a corresponding liveness indicator in storage area 504. Each liveness indicator stores a value that indicates to the system whether the corresponding chunk is storing live data or is not storing live data. For example, a liveness indicator can be a Boolean where when the Boolean is true, it indicates that live data is being stored in the corresponding chunk of memory. If the Boolean is false, it indicates that live data is not being stored in the corresponding chunk of memory. The liveness indicator may also use a different system (other than Boolean) to indicate that live data is stored or that live data is not stored in the corresponding chunks. For example, a value of one may indicate that the corresponding chunk is storing live data and a value of zero may indicate that the corresponding chunk is not storing live data.

Using the architecture of FIG. 5, the microcontroller may determine whether one or more addresses in the on-chip memory are storing live data by accessing the liveness indicator for a particular address space (e.g., a 256-kilobyte chunk) and retrieving the indicator for that memory space. In some implementations, instead of using the liveness indicator, the microcontroller may have access to a memory map indicating which addresses within each memory store live data and which do not. The memory map may be a data structure that includes an indicator for each memory address, whether that memory address is storing live data. Thus, when the microcontroller attempts to determine whether a specific address in the memory stores live data, the microcontroller may query the memory map to determine if that address stores live data. In some embodiments, whenever a liveness indicator indicates that the corresponding memory is free (e.g., when a Tile sets a liveness indicator to a value of zero), a memory structure (e.g., memory bank) may transmit an interrupt to a microcontroller to inform the microcontroller that some data (e.g., corresponding to certain addresses) in that memory structure (e.g., memory bank) is no longer live. The microcontroller may maintain a listing of all available addresses.

Returning to FIG. 4, at 404, responsive to determining that the addresses are not storing any live data for future use, the microcontroller transfers the data from the off-chip memory to the addresses in the on-chip memory. For example, the microcontroller, may determine that a certain number of chunks is needed to transfer data from L3 memory. The microcontroller may identify the chunks for transfer based on whether, for example, those chunks have a liveness indicator that is false, and transfer the data over (e.g., perform a read operation on the L3 memory and write operation into L2 memory). When the data has been transferred to on-chip memory, at 406, the microcontroller marks the address as storing live data. As discussed in relation to FIG. 5, the microcontroller may access the liveness indicators associated with one or more chunks that are now storing live data and write a value of true for those chunks.

At 408, one or more Tiles may access the live data stored in the on-chip memory. The L1 and L2 memories may be connected by direct data transfer paths. The one or more Tiles that need access to the live data that has been transferred to the on-chip memory (e.g., L2 memory) may access the data and transfer the data to each Tile's respective memory (e.g., L1 memory for each Tile). Upon transfer, each Tile may execute computations using the live data stored in the L1 memory.

FIG. 6 is a block diagram of a Tile 180 within the MLA. In this example, all the Tiles are the same. Each Tile 180 includes an L1 memory 682. Each Tile 280 also includes a data transfer pipeline that executes instructions for transferring data to and from the L1 memory 682. Here, the Tiles 180 are arranged in a rectangular array, with each Tile connected to its adjacent neighbors. Interior Tiles are connected to four adjacent Tiles. Edge Tiles are connected to adjacent Tiles and also to L2 memory. In FIG. 6, the L1 memory 682 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles.

Each Tile 180 also includes a compute pipeline 685 for executing computations using data stored in the L1 memory 682. The L1 memory acts as software-configurable registers for the compute pipeline 685. The compute pipeline 685 includes matrix multiplication circuitry 686, such as a systolic array, and circuitry for implementing different types of operators 687. The computations are controlled by compute instructions received and executed by the Tiles.

Thus, when a given Tile executes an instruction to transfer the live data from one or more addresses in the L2 memory into one or more address in the L1 memory of the Tile, the Tile may access, within an L2 memory bank from where the live data was transferred, liveness indicators for each of the addresses and set each of the use-indicators to a value indicating that live data is no longer stored in the corresponding address of the memory bank. For example, if the architecture of FIG. 5 is used in this system, the Tile may execute an instruction to set a liveness indicator for one or more chunks of data storage to a value of false.

When a Tile has finished computations on a set of data, the Tile may transfer the data (whether modified or not) from L1 memory back into L2 memory. This is a statically scheduled instruction that is scheduled by the compiler prior to run time. When the data has been transferred back to L2 memory from L1 memory, the Tile transferring the data may mark (e.g., set a liveness indicator) a portion of the L2 memory as storing live data. For example, the Tile instruction that is generated by the compiler may include a parameter to mark one or more chunks of memory within an L2 memory bank as storing live data.

The Tile may transfer data from L1 memory to L2 memory for a number of uses. For example, the Tile may transfer the data because that Tile is finished executing Tile operations and the data is transferred out because the Tile may use that data in a subsequent operation. Thus, the data may be an intermediate result. In some embodiments, the compiler may have determined prior to run-time that the data is to be stored in L3 memory because it is a result of some type of operation. Thus, the Tile transfers the data from it's L1 memory into a location in the L2 memory and sets the liveness indicator to True. That is, the liveness indicator indicates that the memory location is now in use. If the data is to be transferred into L3 memory (i.e., to the off-chip memory), the microcontroller may execute the instruction to transfer the data. However, the microcontroller must wait to execute the transfer instruction until the liveness indicator is set to True. When the transfer is complete, the microcontroller may set the liveness indicator for the location in the L2 memory as False. That is, the memory is now free to be overwritten.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A method for implementing a machine learning network (MLN) by executing a computer program of instructions on a machine learning accelerator (MLA), the MLA comprising a plurality of Tiles and an on-chip memory implemented on a semiconductor die, wherein Tiles in the plurality of Tiles are configured to execute Tile instructions that access data stored in the on-chip memory, and wherein the Tiles are organized into one or more meshes of interconnected Tiles, the method comprising:
    executing a non-deterministic phase of instructions that transfer data from an off-chip memory to addresses in the on-chip memory by:
        determining whether the addresses in the on-chip memory are storing live data for future use by the Tiles; and
        responsive to determining that the addresses are not storing any live data for future use, transferring the data from the off-chip memory to the addresses in the on-chip memory and marking the addresses as storing live data; and
    the Tiles executing a deterministic phase of statically scheduled Tile instructions that implement computations from the MLN; wherein an order and static schedule for the execution by the Tiles of the statically scheduled Tile instructions is determined by a compiler before run-time and does not depend on run-time conditions, branching or values of inputs to the instructions, and the statically scheduled Tile instructions access the live data that was stored in the on-chip memory during the non-deterministic phase.

2. The method of claim 1, further comprising, subsequently to accessing the live data stored in the on-chip memory, marking the addresses as not storing live data.

3. The method of claim 2, wherein the statically scheduled Tile instructions that access the live data stored in the on-chip memory also mark the addresses as not storing live data.

4. The method of claim 2, wherein multiple statically scheduled Tile instructions access the same live data stored in the on-chip memory, and the addresses are marked as not storing live data only after the last access by said multiple Tile instructions.

5. The method of claim 4, wherein a compiler converts the machine learning network to the computer program of instructions, including statically scheduling an order of execution of the multiple Tile instructions.

6. The method of claim 2, wherein the addresses are marked as not storing live data by Tile instructions separate from the Tile instructions that access the live data stored in the on-chip memory.

7. The method of claim 6, wherein a compiler converts the machine learning network to the computer program of instructions, including statically scheduling an order of execution of the Tile instructions that access the live data and the Tile instructions that mark the addresses as not storing live data.

8. The method of claim 1, wherein the on-chip memory is a multi-level memory system that includes level 1 (L1) memory, level 2 (L2) memory that includes for each address space in the L2 memory a flag indicating whether that address space is storing live data, and direct data transfer paths between the L1 memory and the L2 memory; and wherein the Tiles execute computations using data sets stored in the L1 memory, further comprising:
    during the non-deterministic phase, transferring the live data from the off-chip memory to the L2 memory; and
    during the deterministic phase, transferring the live data from the L2 memory to the L1 memory and executing computations using the live data stored in the L1 memory.

9. The method of claim 8, wherein transferring the live data from the L2 memory to the L1 memory comprises:
    executing, using a Tile an instruction to transfer the live data from one or more addresses in the L2 memory into one or more addresses in the L1 memory associated with the Tile;
    accessing, within an L2 memory bank from where the live data was transferred, a plurality of liveness indicators corresponding to the addresses from where the live data was transferred; and
    setting each of the plurality of liveness indicators to a value indicating that live data is not stored in the corresponding addresses of the memory bank.

10. The method of claim 1, further comprising:
    a compiler converting the machine learning network to the computer program of instructions, including the non-deterministic phase of instructions and the deterministic phase of statically scheduled Tile instructions.

11. The method of claim 1, further comprising:
subsequently to executing the statically scheduled Tile instructions transferring, using the Tiles, processed live data from a first on-chip memory to a second on-chip memory; and
marking one or more addresses in the second on-chip memory as storing processed live data.

12. The method of claim 1, wherein the non-deterministic phase of instructions is executed by a controller.

13. The method of claim 1, wherein marking the addresses as storing live data comprises:
setting a corresponding live data flag for each memory bank represented by the addresses to indicate live data in each memory bank; or
setting, in a data structure representing a memory space containing the addresses, each memory location representing the addresses to indicate live data.

14. The method of claim 1, wherein execution of the deterministic phase of statically scheduled Tile instructions starts responsive to marking the addresses as storing live data.

15. The method of claim 1, wherein the off-chip memory that is not on the same die as the on-chip memory system, and wherein the Tile instructions include instructions for data transfers within the on-chip memory system and do not include instructions for data transfers to and from the off-chip memory system, and a compiler statically schedules the Tile data transfer instructions and does not statically schedule the instructions for data transfers to and from the off-chip memory system.

16. The method of claim 1 wherein the on-chip memory system comprises static random-access memory (SRAM) and the off-chip memory comprises dynamic random-access memory (DRAM).

17. The method of claim 1, wherein the on-chip memory is a multi-level memory system that includes level 1 (L1) memory, level 2 (L2) memory that includes for each address space in the L2 memory a flag indicating whether that address space is storing live data, and direct data transfer paths between the L1 memory and the L2 memory; and wherein the Tiles execute computations using data sets stored in the L1 memory, further comprising:
during the deterministic phase, transferring, using a Tile, new data from the L1 memory to the L2 memory; and
during the non-deterministic phase, transferring, using the microcontroller, the new data from the L2 memory to the off-chip memory.

18. The method of claim 1 wherein determining whether the addresses in the on-chip memory are storing live data comprises: accessing liveness indicators corresponding to the addresses, wherein the liveness indicators indicate whether the addresses are storing live data.

19. A system comprising:
a machine learning accelerator (MLA), the MLA comprising a plurality of Tiles and an on-chip memory implemented on a semiconductor die, wherein Tiles in the plurality of Tiles are configured to execute Tile instructions that access data stored in the on-chip memory, and wherein the Tiles are organized into one or more meshes of interconnected Tiles; and
a processor executing a compiler that receives a description of a machine learning network (MLN) and compiles the description into a computer program of instructions comprising:
a non-deterministic phase of instructions that transfer data from an off-chip memory to addresses in the on-chip memory by: determining whether the addresses in the on-chip memory are storing live data for future use by the Tiles; and responsive to determining that the addresses are not storing any live data for future use, transferring the data from the off-chip memory to the addresses in the on-chip memory and marking the addresses as storing live data; and
a deterministic phase of statically scheduled Tile instructions that implement computations from the MLN; wherein an order and static schedule for the execution by the Tiles of the statically scheduled Tile instructions is determined by the compiler before run-time and does not depend on run-time conditions, branching or values of inputs to the instructions, and the statically scheduled Tile instructions access the live data that was stored in the on-chip memory during the non-deterministic phase.

20. The system of claim 19, wherein subsequently to accessing the live data stored in the on-chip memory, addresses are marked as not storing live data; multiple statically scheduled Tile instructions access the same live data stored in the on-chip memory, and the addresses are marked as not storing live data only after the last access by said multiple Tile instructions.

* * * * *